United States Patent
Shu et al.

(10) Patent No.: US 8,755,109 B2
(45) Date of Patent: Jun. 17, 2014

(54) COLOR ELECTRONIC PAPER DEVICE AND MANUFACTURING METHOD THEREOF

(75) Inventors: Fang-An Shu, Hsinchu (TW); Ted-Hong Shinn, Hsinchu (TW); Yao-Chou Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 199 days.

(21) Appl. No.: 13/348,231

(22) Filed: Jan. 11, 2012

(65) Prior Publication Data

US 2012/0262776 A1  Oct. 18, 2012

(30) Foreign Application Priority Data

Apr. 13, 2011  (TW) .............................. 100112745 A

(51) Int. Cl.
*G02B 26/00* (2006.01)
(52) U.S. Cl.
USPC .......................................... 359/296

(58) Field of Classification Search
USPC ................... 359/296, 491.01, 290–292, 237, 359/265–275, 891, 900; 345/107, 105; 349/97, 104, 106, 108; 156/275.3, 156/275.7, 330, 60, 182; 430/7
See application file for complete search history.

(56) References Cited

U.S. PATENT DOCUMENTS 6,127,088 A * 10/2000 Yamada et al. ............... 430/203
6,219,113 B1 * 4/2001 Takahara ....................... 349/42
6,476,888 B2 * 11/2002 Yamanashi .................. 349/106

* cited by examiner

*Primary Examiner* — Tuyen Tra
(74) *Attorney, Agent, or Firm* — Guice Patents PLLC

(57) ABSTRACT

A color electronic paper device and manufacturing method thereof are provided. The device includes: a front panel; a color filter layer, placed over the front panel; a color protection layer, being a thermoplastic transparent layer placed over the color filter layer; an adhesive layer, placed over the color protection layer; and a cover, placed over the adhesive layer.

4 Claims, 2 Drawing Sheets

COLOR ELECTRONIC PAPER DEVICE AND MANUFACTURING METHOD THEREOF

BACKGROUND OF THE INVENTION

1. Field of the Invention

The present invention relates to a color electronic paper device, especially to a color electronic paper device capable of avoiding color fading.

2. Description of the Related Art

Due to advances in electrophoretic display technology, electronic paper devices capable of displaying color pictures have begun to appear in the market.

Please refer to FIG. 1, which illustrates a sectional view of a color electronic paper device according to a prior art. As illustrated in FIG. 1, the color electronic paper device includes, from bottom to top, a front panel 110, a color filter layer 120, a transparent adhesive layer 130, and a cover 140.

In the device, the front panel 110 includes an electrophoretic display layer and a pixel electrode layer to control the brightness of pixels of the color electronic paper device.

The color filter layer 120, placed over the front panel 110, has an array of (R, G, B) pigments for filtering the light emitted from the front panel 110, to output corresponding red, green, and blue light beams.

The transparent adhesive layer 130, placed over the color filter layer 120, is adhered to the color filter layer 120.

The cover 140, placed over the transparent adhesive layer 130, is adhered to the transparent adhesive layer 130.

However, the prior art color electronic paper devices tend to have color fading after assembly, and the color fading severely impacts the display quality of color electronic paper devices. Trying to make the (R, G, B) pigments of the color filter layer possess high stability—to be chemically inactive—may be a solution for avoiding color fading. Nevertheless, to attain highly stable pigments, the cost—including time and money—can be relatively high, disadvantaging the products in the market.

To solve the foregoing problems of the prior art color electronic paper device, it is necessary to do a thorough analysis on the device of the color electronic paper device, so as to figure out an effective strategy to avoid color fading, and thereby improve the display quality of color electronic paper devices.

SUMMARY OF THE INVENTION

One objective of the present invention is to disclose a color electronic paper device, which can effectively avoid color fading, and thereby improve the display quality of color electronic paper devices.

Another objective of the present invention is to disclose a method of manufacturing a color electronic paper device, which can effectively avoid color fading, and thereby improve the display quality of color electronic paper devices.

To attain the foregoing objectives, a color electronic paper device is proposed, the device including a front panel, a color filter layer, a color protection layer, a transparent adhesive layer, and a cover.

The front panel includes an electrophoretic display layer and a pixel electrode layer to control the brightness of pixels of the color electronic paper.

The color filter layer, placed over the front panel, has an array of (R, G, B) pigments for filtering the light emitted from the front panel, to output corresponding red, green, and blue light beams.

The color protection layer is a thermoplastic transparent material layer placed over the color filter layer.

The transparent adhesive layer, placed over the color protection layer, is adhered to the color protection layer.

The cover, placed over the transparent adhesive layer, is adhered to the transparent adhesive layer.

To attain the foregoing objectives, a method of manufacturing a color electronic paper device is proposed, the method including the steps of:

depositing a color filter layer over a front panel (step a);

adhering a bottom face of a color protection layer to a top face of the color filter layer, and the color protection layer is a thermoplastic transparent material layer (step b);

adhering a bottom face of a transparent adhesive layer to a top face of the color protection layer (step c); and adhering a top face of the transparent glue layer to a cover (step d).

To attain the foregoing objectives, another method of manufacturing a color electronic paper device is proposed, the method including the steps of:

depositing a color filter layer over a front panel (step a);

adhering a bottom face of a color protection layer to a top face of the color filter layer, and the color protection layer is a thermoplastic transparent material layer (step b);

adhering a top face of a transparent adhesive layer to a bottom face of a cover (step c); and adhering a bottom face of the transparent adhesive layer to a top face of the color protection layer (step d).

To make it easier for our examiner to understand the objective of the invention, its device, innovative features, and performance, we use a preferred embodiment, together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
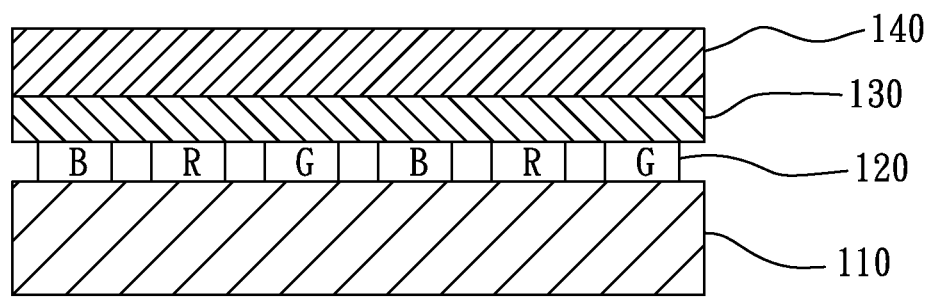
FIG. 1 illustrates a sectional view of a color electronic paper device according to a prior art.

After examining the device of the color electronic paper devices of FIG. 1 having color fading, the inventors of the present invention discovered that the color fading is due to interaction of the color filter layer with the transparent adhesive layer, and the interaction gets worse at higher temperatures.

In view of the mentioned discovery, the embodiments of the present invention inserts a color protection layer between the color filter layer and the transparent adhesive layer, to prevent the color filter layer from being eroded by the transparent adhesive layer, and thereby solve the problem of color fading. The design of the present invention can be applied to flexible or non-flexible color electronic paper displays.

Figure 2:
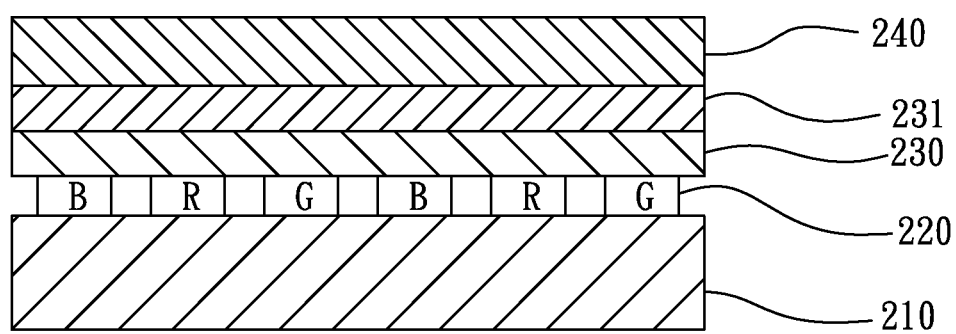
FIG. 2 illustrates a sectional view of a color electronic paper device according to a preferred embodiment of the present invention.

Please refer to FIG. 2, which illustrates a sectional view of a color electronic paper device according to a preferred embodiment of the present invention. As illustrated in FIG. 2, the color electronic paper device includes, from bottom to top, a front panel 210, a color filter layer 220, a color protection layer 230, a transparent adhesive layer 231, and a cover 140.

In the device, the front panel 210 includes an electrophoretic display layer and a pixel electrode layer to control the brightness of pixels of the color electronic paper.

The color filter layer 220, placed over the front panel 210, has an array of (R, G, B) pigments for filtering the light emitted from the front panel 210, to output corresponding red, green, and blue light beams.

The color protection layer 230, placed over the color filter layer 220, is a thermoplastic transparent material layer, which can be implemented with thermoplastic resin (like Polyvinyl Butyral resin or Polyvinyl chloride resin), and the thickness of which is preferably between 1 µm and 30 µm. Thanks to the higher melting point of the thermoplastic transparent material, the color protection layer 230 can effectively prevent the color filter layer 220 from being eroded by the transparent adhesive layer 231, and thereby maintain color saturation.

The transparent adhesive layer 231, placed over the color protection layer 230, is adhered to the color protection layer 230.

The cover 240, placed over the transparent adhesive layer 231, is adhered to the transparent adhesive layer 231.

Besides, the front panel 210 can attach to a TFT backplane, and the TFT backplane below the front panel 210 is used to drive the pixel electrode layer of the front panel 210.

Based on the foregoing specification, the embodiment of the present invention further proposes a method of manufacturing a color electronic paper device, including the steps of: depositing a color filter layer over a front panel (step a); adhering the bottom face of a color protection layer to the top face of the color filter layer, and the color protection layer is a thermoplastic transparent material layer (step b); adhering the bottom face of a transparent adhesive layer to the top face of the color protection layer (step c); and adhering the top face of the transparent adhesive layer to a cover (step d).

In step a, the color filter layer has an array of (R, G, B) pigments.

In step b, the bottom face of the color protection layer is adhered to the top face of the color filter layer preferably by utilizing a hot rolling process, which includes using a hot roller and an autoclave, and the autoclave preferably performs deaeration with inside temperature ranging between 40° C. and 100° C., and inside pressure greater than 1 atm. The color protection layer can be implemented with thermoplastic resin and the thickness of which is preferably between 1 µm and 30 µm.

In step c, the bottom face of the transparent adhesive layer is adhered to the top face of the color protection layer preferably by utilizing a hot rolling process, which includes using a hot roller and an autoclave, and the autoclave preferably performs deaeration with inside temperature ranging between 40° C. and 100° C., and inside pressure greater than 1 atm.

In step d, the cover is adhered to the top face of the transparent adhesive layer preferably by utilizing a hot rolling process, which includes using a hot roller and an autoclave, and the autoclave preferably performs deaeration with inside temperature ranging between 40° C. and 100° C., and inside pressure greater than 1 atm.

Based on the foregoing specification, the embodiment of the present invention further proposes another method of manufacturing a color electronic paper device, including the steps of: depositing a color filter layer over a front panel (step a); adhering the bottom face of a color protection layer to the top face of the color filter layer, and the color protection layer is a thermoplastic transparent material layer (step b); adhering the top face of a transparent adhesive layer to the bottom face of a cover (step c); and adhering the bottom face of the transparent adhesive layer to the top face of the color protection layer (step d).

In step a, the color filter layer has an array of (R, G, B) pigments.

In step b, the bottom face of the color protection layer is adhered to the top face of the color filter layer preferably by utilizing a hot rolling process, which includes using a hot roller and an autoclave, and the autoclave preferably performs deaeration with inside temperature ranging between 40° C. and 100° C., and inside pressure greater than 1 atm. The color protection layer can be implemented with thermoplastic resin like, and the thickness of which is preferably between 1 µm and 30 µm.

In step c, the top face of the transparent adhesive layer is adhered to the bottom face of the cover preferably by utilizing a hot rolling process, which includes using a hot roller and an autoclave, and the autoclave preferably performs deaeration with inside temperature ranging between 40° C. and 100° C., and inside pressure greater than 1 atm.

In step d, the bottom face of the transparent adhesive layer is adhered to the top face of the color protection layer preferably by pressing the cover with a hot roller, and then using an autoclave for deaeration, wherein the autoclave preferably performs deaeration with inside temperature ranging between 40° C. and 100° C., and inside pressure greater than 1 atm.

In conclusion, the color electronic paper device of the embodiment of the present invention proposes a thermoplastic material layer—can be implemented with common materials and by common manufacture processes—for preventing the color filter layer from being eroded by the transparent adhesive layer, and thereby avoiding color fading. The present invention therefore does improve the prior art color electronic paper devices.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A method of manufacturing a color electronic paper device, comprising the steps of:
   depositing a color filter layer over a front panel;
   adhering a bottom face of a color protection layer to a top face of said color filter layer, wherein said color protection layer is a thermoplastic transparent layer;
   adhering a top face of an adhesive layer to a bottom face of a cover; and
   adhering a bottom face of said adhesive layer to a top face of said color protection layer.

2. The method as claim 1, wherein the bottom face of said color protection layer is adhered to the top face of said color filter layer by using a hot rolling process.

3. The method as claim 2, wherein said hot rolling process includes using a hot roller and an autoclave.

4. The method as claim 1, wherein said color protection layer is implemented with thermoplastic resin.

* * * * *